US012792981B2

(12) United States Patent
Islam et al.

(10) Patent No.: US 12,792,981 B2
(45) Date of Patent: Nov. 10, 2026

(54) METHOD AND SYSTEM FOR OPERATING A FLEET OF VEHICLES

(71) Applicant: Volvo Autonomous Solutions AB, Gothenburg (SE)

(72) Inventors: Mohammad Manjurul Islam, Gothenburg (SE); David Rylander, Sätila (SE)

(73) Assignee: Volvo Autonomous Solutions AB, Gothenburg (SE)

(*) Notice: Subject to any disclaimer, the term of this patent is extended or adjusted under 35 U.S.C. 154(b) by 5 days.

(21) Appl. No.: 18/956,899

(22) Filed: Nov. 22, 2024

(65) Prior Publication Data

US 2025/0086535 A1 Mar. 13, 2025

Related U.S. Application Data

(63) Continuation of application No. 17/428,166, filed as application No. PCT/EP2019/053050 on Feb. 7, 2019, now Pat. No. 12,198,080.

(51) Int. Cl.

| | |
|---|---|
| ***G06Q 10/0631*** | (2023.01) |
| ***G05B 13/02*** | (2006.01) |
| ***G06N 20/00*** | (2019.01) |

(52) U.S. Cl.
CPC ... *G06Q 10/06311* (2013.01); *G05B 13/0265* (2013.01); *G06N 20/00* (2019.01)

(58) Field of Classification Search
CPC ................................................ G06Q 10/06311
See application file for complete search history.

(56) References Cited

U.S. PATENT DOCUMENTS 11,531,964 B1 * 12/2022 Leise ..................... G07C 5/085
11,545,034 B2 * 1/2023 Pfadler ................ G05D 1/0246
(Continued)

FOREIGN PATENT DOCUMENTS

| | | | |
|---|---|---|---|
| CN | 104376716 | A | 2/2015 |
| JP | 2018142308 | A | 9/2018 |
| WO | 2018142507 | A1 | 8/2018 |

OTHER PUBLICATIONS

International Search Report and Written Opinion dated Oct. 18, 2019 in corresponding International PCT Application No. PCT/EP2019/053050, 12 pages.
(Continued)

*Primary Examiner* — Jean Paul Cass
(74) *Attorney, Agent, or Firm* — Jeffri A. Kaminski; Venable LLP

(57) ABSTRACT

A method for operating a plurality of vehicles is disclosed. The method comprises receiving a first set of vehicle data and a second set of vehicle data, the vehicle data comprising information about each vehicle of the plurality of vehicles, each vehicle operating along at least one fixed route, receiving a first set of environmental data and a second set of environmental data, the environmental data comprising information about each fixed route, and estimating, by means of the global self-learning model and each local-self learning model, a schedule parameter for each vehicle of the plurality of vehicles based on the received first set of vehicle data, the received first set of environmental data, the received second set of vehicle data, the received second set of environmental data, and a predefined interaction model between the global self-learning model and each local-self learning model.

14 Claims, 3 Drawing Sheets

(56) References Cited

U.S. PATENT DOCUMENTS

| | | | | |
|---|---|---|---|---|
| 11,550,334 | B2 * | 1/2023 | Zheng | G06N 3/006 |
| 11,551,167 | B2 * | 1/2023 | Monovich | G01C 21/343 |
| 11,554,638 | B2 * | 1/2023 | Schumacher | B60H 1/0045 |
| 11,577,746 | B2 * | 2/2023 | Wray | B60W 30/18154 |
| 11,597,399 | B1 * | 3/2023 | Smith | B60K 6/48 |
| 11,613,269 | B2 * | 3/2023 | Wray | B60W 50/0098 701/27 |
| 11,635,758 | B2 * | 4/2023 | Wray | B60W 30/04 701/27 |
| 11,648,953 | B2 * | 5/2023 | Tod | B60W 50/0205 701/30.3 |
| 11,675,366 | B2 * | 6/2023 | Galoogahi | G01S 17/88 701/23 |
| 11,702,070 | B2 * | 7/2023 | Wray | B60W 30/18163 701/28 |
| 11,710,324 | B2 * | 7/2023 | St. Romain, II | G06V 20/56 382/159 |
| 11,714,971 | B2 * | 8/2023 | Wray | B60W 50/14 701/23 |
| 11,719,753 | B2 * | 8/2023 | Brown | B60W 30/0956 702/179 |
| 11,761,776 | B2 * | 9/2023 | Wang | G08G 1/127 701/410 |
| 11,776,257 | B2 * | 10/2023 | Price | G06F 18/217 382/125 |
| 11,782,438 | B2 * | 10/2023 | Bentahar | B60W 30/08 701/27 |
| 11,820,302 | B2 * | 11/2023 | Srivastava | B60K 6/48 |
| 2008/0189226 | A1 | 8/2008 | Wurster | |
| 2014/0180501 | A1 | 6/2014 | Kyllmann | |
| 2014/0297182 | A1 | 10/2014 | Casson et al. | |
| 2015/0088581 | A1 | 3/2015 | Ikawa | |
| 2016/0368495 | A1 | 12/2016 | Luther et al. | |
| 2018/0158020 | A1 | 6/2018 | Khasis | |
| 2018/0170349 | A1 * | 6/2018 | Jobson | B60L 7/18 |
| 2018/0247207 | A1 * | 8/2018 | Ristovski | G06N 20/20 |
| 2018/0349785 | A1 * | 12/2018 | Zheng | B60W 30/00 |
| 2018/0357736 | A1 | 12/2018 | Sun et al. | |
| 2020/0070801 | A1 * | 3/2020 | Staats | B60L 53/53 |
| 2022/0197306 | A1 * | 6/2022 | Cella | B22F 10/85 |
| 2022/0366336 | A1 * | 11/2022 | Khasis | G08G 1/04 |
| 2023/0078448 | A1 * | 3/2023 | Cella | G06Q 10/06311 705/7.13 |
| 2023/0098602 | A1 * | 3/2023 | Cella | G05B 13/0265 700/248 |
| 2023/0106268 | A1 * | 4/2023 | Venkatesh | G06Q 10/06311 701/23 |

OTHER PUBLICATIONS

International Preliminary Report on Patentability dated Dec. 14, 2020 in corresponding International PCT Application No. PCT/EP2019/053050, 20 pages.

Japan Office Action dated Feb. 28, 2023 in corresponding Japan Patent Application No. 2021-546304 8 pages.

Japan Decision of Refusal dated Jul. 14, 2023 in corresponding Japan Patent Application No. 202-1546304, 4 pages.

European Communication pursuant to Article 94(3) EPC dated Mar. 13, 2024 in corresponding European Patent Application No. 19705935.5, 8 pages.

* cited by examiner

METHOD AND SYSTEM FOR OPERATING A FLEET OF VEHICLES

TECHNICAL FIELD

The present invention relates to a system and method for operating a fleet of vehicles and a corresponding non-transitory computer-readable storage medium. The fleet of vehicles may for example comprise buses, cars, trucks, construction vehicles, or the like.

BACKGROUND ART

It is common for commercial companies and government institutions to maintain a fleet of vehicles and therefore to have an interest in keeping track of the vehicles and shipments, as well as the performance and well-being of their drivers. Moreover, the vehicles are frequently equipped with apparatuses arranged to track the vehicles' geographic locations, speeds, headings, cargo temperature, engine performance parameters, and other data. This information is then used, for example, to maintain the vehicles, estimate delivery/arrival times, provide warning of possible damage to cargo, and to evaluate driver performance.

A typical segment, in which arrival time is of particular importance is public transport. One of the most, if not the most, complained of problem associated with public transportation is time wasted waiting for public transit vehicles to arrive at a passenger's particular transit stop, and uncertainty as to service and/or arrival time at transit connections or destinations. However, estimation of arrival times is an important aspect in other type of segments utilizing vehicle fleets, such as e.g. shipping and logistics, where delivery times are of critical importance for consumers.

Thus, accurate predictions or estimations of arrival time is not only an important aspect for the users/consumers of the service, but also for the system owner/operator in order to be able to efficiently plan resource, schedule routes, broadcasting of information, planning charging of Electric Vehicles (EVs), warehouse preparations, etc.

To this end, static methods are often used based on basic estimations, e.g. calculating distances and assuming speed profiles, albeit simple such methods are often not adequately accurate. Especially when vehicles or routes deviate from generalized models. As a remedy to this, some systems use real-time data based on a current geographical position of the vehicles, assumed speed profiles of the route, temporary route obstacles, etc. However, even though such solutions display an improved accuracy as compared to the static methods, they are still based on generalized assumptions which are not applicable for all situations.

Accordingly, there is a need for a new and improved method and system for managing a fleet of vehicles whereby more accurate estimations of arrival times, fuel/energy consumptions, and such can be made.

SUMMARY OF THE INVENTION

It is therefore an object of the present invention to provide a method, a non-transitory computer-readable storage medium, and a system for operating a fleet of vehicles, which can be used to predict a schedule parameter for each vehicle, such as e.g. arrival time, more accurately than presently known systems.

The term exemplary is in the present context to be understood as serving as an instance, example or illustration.

According to a first aspect of the invention, the object is achieved by a method according to claim 1. The method comprises receiving a first set of vehicle data and a second set of vehicle data, the vehicle data comprising information about each vehicle of the plurality of vehicles, each vehicle operating along at least one fixed route, receiving a first set of environmental data and a second set of environmental data, the environmental data comprising information about each fixed route, and estimating, by means of the global self-learning model and each local-self learning model, a schedule parameter for each vehicle of the plurality of vehicles based on the received first set of vehicle data, the received first set of environmental data, the received second set of vehicle data, the received second set of environmental data, and a predefined interaction model between the global self-learning model and each local-self learning model. The method further comprises receiving a measured schedule parameter for each vehicle, comparing the estimated schedule parameter with the received measured schedule parameter, and updating the global self-learning model and each local self-learning model based on the comparison of the estimated schedule parameter with the received measured schedule parameter.

The adaption of a global self-learning model and a plurality of local self-learning models (e.g. machine learning algorithms) in vehicle fleet management systems allows for improved predictability for a variety of desirable schedule parameters (e.g. arrival time, fuel consumption, energy consumption) which will consequently facilitate future system planning. In particular, the utilization of an interaction between a common "global" self-learning model and several local self-learning models, renders the whole management system more versatile and dynamic. Moreover, this allows for a type of plug-and-play functionality, where new vehicles may be added to an operational site or route without a need for reconfiguration of the whole prediction model.

Moreover, by for example being able to more accurately predicting arrival times it is possible to more accurately manage resources at the point of arrival (e.g. warehouse) in order to improve operational efficiency. In another example scenario, improved arrival time prediction will lead to a greater customer/passenger satisfaction for public transport operators/owners. In terms of energy consumption predictions it may result in facilitated resource allocation in terms of re-charging facilities in order to avoid idle times in the vehicle fleet or being able to efficiently schedule recharging at non-peak hours of the electric grid, thereby increasing operational efficiency and reducing costs. The arrival time may be in reference to any defined destination, and may accordingly be an intermediate check point or final destination.

The first set of vehicle data and the second set of data may comprise the same information, or various subsets of available data based on the specific application and desired specifications.

Further, according to an exemplary embodiment of the present invention, the predefined interaction model comprises making a first estimation of the schedule parameter for each vehicle by means of the global self-learning model based on the received first set of vehicle data and the received first set of environmental data, and making a second estimation of the schedule parameter by means of each local self-learning model for each corresponding vehicle based on the received second set of vehicle data and the received second set of environmental data, and the first estimation of the schedule parameter for each vehicle, the second estimation being the estimated schedule parameter.

Stated differently, the local self-learning models make an initial estimation of the schedule parameter (e.g. arrival time) for the associated vehicle, whereafter this first estimation is used as an input to the global self-learning model in order to further improve the accuracy of the estimation by accounting for "global parameters" and interactions between the vehicles on a system level.

According to a second aspect of the invention, the object is achieved by a non-transitory computer-readable storage medium according to claim 10. The non-transitory computer-readable storage medium storing one or more programs configured to be executed by one or more processors of a vehicle fleet management system, the one or more programs comprising instructions for performing the method according to any one of the embodiments disclosed herein. With this aspect of the invention, similar advantages and preferred features are present as in the previously discussed first aspect of the invention, and vice versa.

Further, according to a third aspect of the invention, the object is achieved by a system according to claim 11. The system comprises a first module comprising control circuitry configured to receive a first set of vehicle data and a second set of vehicle data, the vehicle data comprising information about each vehicle of the plurality of vehicles, each vehicle operating along at least one fixed route, and receive a first set of environmental data and a second set of environmental data, the environmental data comprising information about each fixed route. Moreover, the control circuitry is configured to estimate, by means of the global self-learning model and each local-self learning model, a schedule parameter for each vehicle of the plurality of vehicles based on the received first set of vehicle data, the received first set of environmental data, the received second set of vehicle data, the received second set of environmental data, and a predefined interaction model between the global self-learning model and each local-self learning model. Further, the system comprises a second module comprising a control unit to receive the estimated schedule parameter from the first module, receive a measured schedule parameter for each vehicle, compare each estimated schedule parameter with each corresponding received measured schedule parameter, and send a command signal in order to update the global self-learning model and each local self-learning model based on the comparison. With this aspect of the invention, similar advantages and preferred features are present as in the previously discussed first aspect of the invention, and vice versa.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

With references to the appended drawings, below follows are more detailed description of example embodiments of the invention, in which.

DETAILED DESCRIPTION

Figure 1:
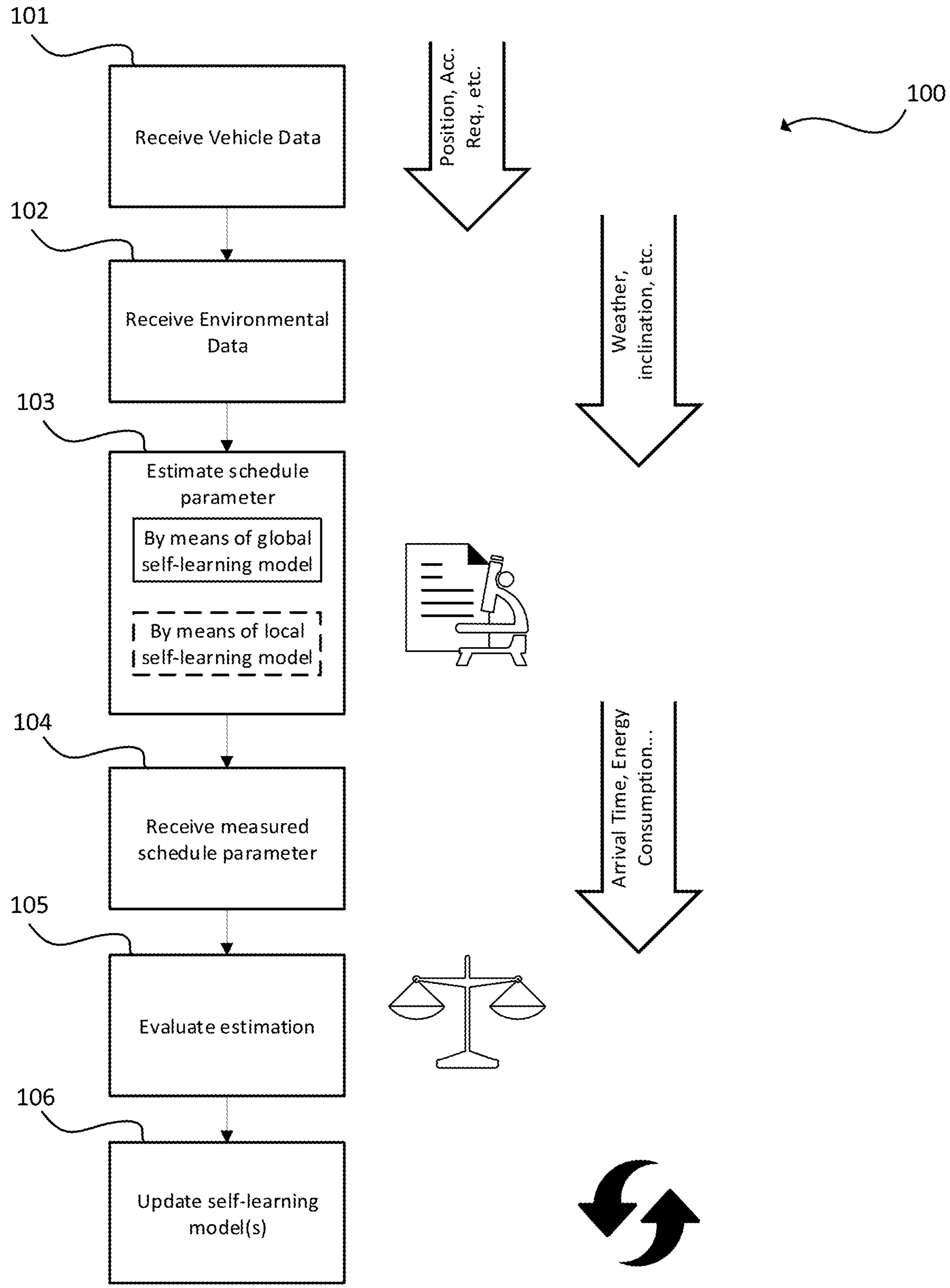
FIG. 1 is a schematic flow-chart representation of a method for operating a fleet of vehicles according to an embodiment of the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

FIG. 1 shows a flow-chart representation of a method 100 for operating a fleet of vehicles according to an exemplary embodiment of the present invention. In more detail, each vehicle vehicles comprises an associated local self-learning model and the plurality of vehicles are connected to a global self-learning model The method is particularly suitable for operating a fleet of surface vehicles such as e.g. buses, cars, trucks, construction vehicles, and any other vehicles operating along one or more fixed and recurring routes. An example is buses used in public transportation.

The method comprises receiving 101, a first set of vehicle data and a second set of vehicle data, the vehicle data comprising information about each vehicle of the plurality of vehicles, each vehicle operating along at least one fixed route. The global self-learning model, may also be referred to as a global Artificial Intelligence (global AI) or a shared AI, can for example be a machine-learning model based on e.g. reinforcement learning. The term global is to be understood as that the self-learning model is at a system level, i.e. common to or shared by a plurality of individual vehicles in the fleet. Further, each vehicle of the plurality of vehicles is provided with a local self-learning model. In other words, each vehicle of the plurality of vehicles has a corresponding "local AI", such that an AI network or AI system is formed.

The vehicle data may for example comprise one or more of a geographical position of each vehicle, an acceleration request of each vehicle, a brake request of each vehicle, a cargo load of each vehicle, a transmission type of each vehicle, a state of charge of a traction battery of each vehicle, a state of health of the traction battery of each vehicle, and an axle load of each vehicle.

Further, the method 100 comprises receiving 102 a first set of environmental data and a second set of environmental data, the environmental data comprising information about each fixed route. In other words, the global AI and local AIs are used to also account for various environmental factors. In more detail, the environmental data one or more of weather along each fixed route, route data (traffic, congestion, speed limits, friction level, etc.) of each fixed route, a road curvature of each fixed route, an inclination profile of each fixed route, operational data (loading or unloading of cargo or passengers, number of mandatory stops, etc.) for each fixed route, infrastructural data (number of traffic lights, constructional work, number of gates to pass, single lane traffic areas, etc.) for each fixed route, a time of day, and calendar data (day of the week, month, etc.).

Next, a schedule parameter is estimated 103 (by the AI system comprising the interacting global AI and local AIs) for each vehicle based on the received first set of vehicle data, the received first set of environmental data, the received second set of vehicle data, the received second set of environmental data, and a predefined interaction model between the global self-learning model and each local-self learning model. In other words, the self-learning models make a best guess of a selected schedule parameter (e.g. arrival time, fuel consumption, energy consumption, etc.) for each vehicle of the plurality of vehicles, based on the received information and some predefined interaction model. Naturally, in the example of the schedule parameter being an arrival time, it is assumed that the global self-learning model has access to a start time and start position of each vehicle (may be comprised in the received 101 first set of vehicle data).

Further, the method 100 comprises a step of receiving 104 a measured schedule parameter for each vehicle. In other words, an external sensor system measures the sought after schedule parameter (e.g. arrival time or energy consumption for electric vehicles), which will be forming the ground truth for the self-learning model. Then, the estimated schedule parameter and the received measured schedule parameter are compared 105 to each other. In other words, the method comprises an evaluation step 105 in which the global self-learning model is evaluated based on the accuracy of the performed estimation 103.

Still further, the method 100 comprises a step of updating 106 the global self-learning model and each local self-learning model based on the preceding comparison 105 between the estimated schedule parameter and the received measured schedule parameter (ground truth). In the exemplary embodiment, where the self-learning models are based on reinforcement learning, each model is accordingly rewarded or penalized based on the quality/accuracy of the estimation.

The predefined interaction model, i.e. the relationship between the global self-learning model and each local self-learning in the estimation 103 step may be defined in alternative ways. For example, the predefined interaction model may comprise making a first estimation of the schedule parameter for each vehicle by means of the global self-learning model based on the received first set of vehicle data and the received first set of environmental data. Next, a second estimation of the schedule parameter by means of each local self-learning model for each corresponding vehicle is made based on the received second set of vehicle data and the received second set of environmental data, and the first estimation of the schedule parameter for each vehicle, the second estimation being the estimated schedule parameter. Stated differently, the AI system is configured to first estimate the schedule parameter for each vehicle by the global AI and use this first estimation as input for each local AI in order to make a second estimation which will be the final estimation/prediction of the schedule parameter for each vehicle.

However, alternatively the roles of the self-learning models may be reversed such that the first estimation is made locally in each vehicle and these first estimations are used as input to the global self-learning model to provide the final estimation/prediction of the schedule parameter for each vehicle.

Figure 2:
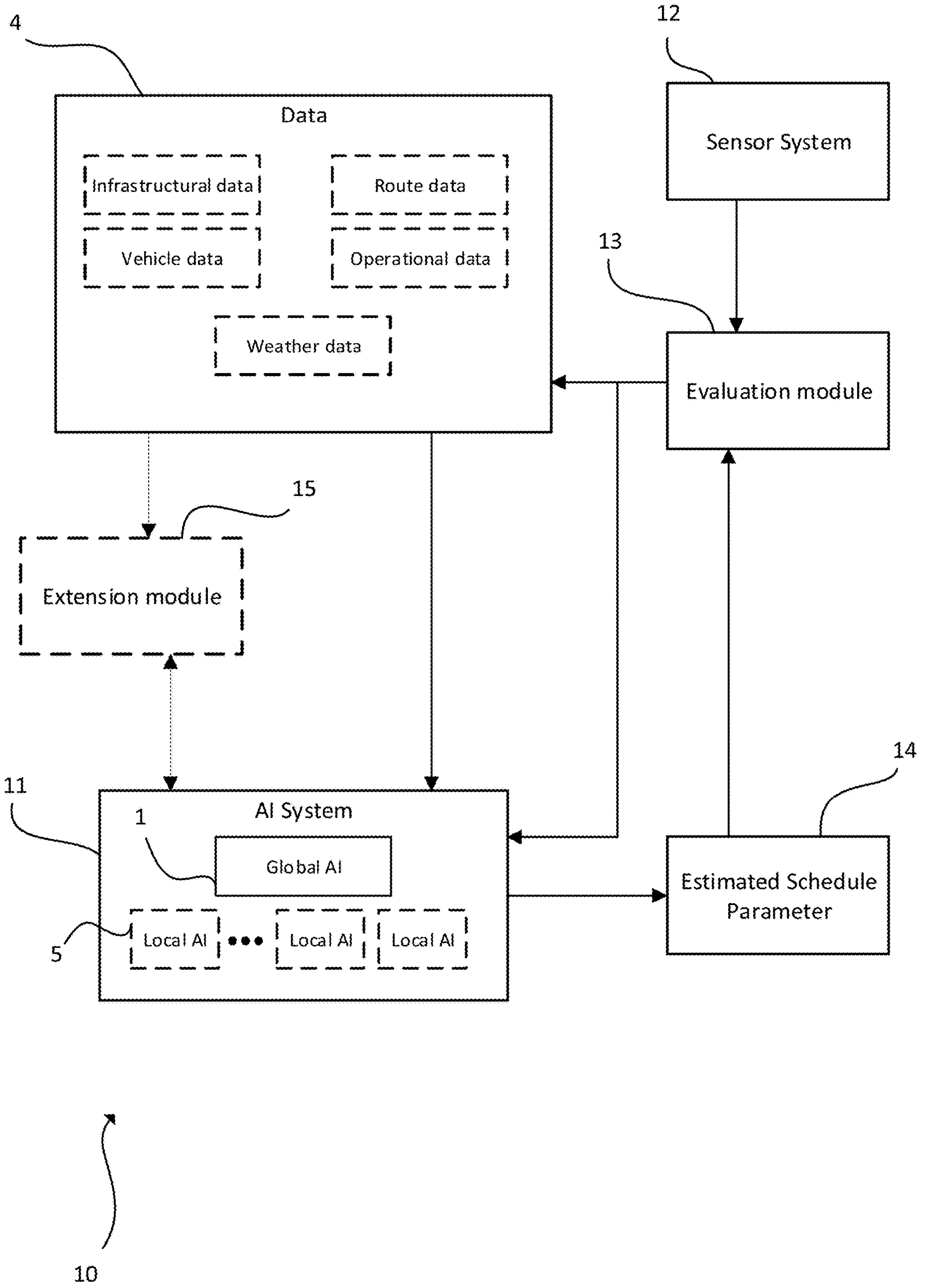
FIG. 2 is a schematic overview illustration of a system for operating a fleet of vehicles according to an embodiment of the present invention.

FIG. 2 is a schematic block diagram representation of a system 10 for operating a fleet of vehicles in accordance with an embodiment of the present invention. In particular, each vehicle comprises an associated local self-learning model and the plurality of vehicles are connected to a global self-learning model. Moreover, the system 10 is particularly suitable for estimating schedule parameters associated with a mission of the fleet of vehicles, such as e.g. arrival times, fuel consumptions and so on. The system 10 has a first module 11 comprising control circuitry (not shown). The control circuitry may be provided by means of appropriate software, hardware or a combination thereof.

Moving on, the control circuitry is configured to receive a first set of vehicle data and a second set of vehicle data, the vehicle data comprising information about each vehicle of the plurality of vehicles, each vehicle operating along at least one fixed route. Further the control circuitry is configured to receive a first set of environmental data and a second set of environmental data, the environmental data comprising information about each fixed route. The vehicle data and the environmental data may for example be retrieved from a database/data storage unit 4 which includes different groups of data, amongst other vehicle/agent specific data such as e.g. load, cargo, axle load, transmission type, fuel levels, state of charge of batteries, state of health of batteries, etc. The data storage unit 4 may be a remote unit that is communicatively connected to each vehicle, meaning that it is accessible to each local self-learning model (via e.g. an external network). An advantage of using a remote database 4 is that data from perception systems of a plurality of vehicles can be accessed and stored thereby increasing the reliability in for example the environmental data.

The control circuitry is further configured to estimate a schedule parameter 14, by means of the global self-learning model and each local-self learning model, a schedule parameter for each vehicle of the plurality of vehicles based on the received first set of vehicle data, the received first set of environmental data, the received second set of vehicle data, the received second set of environmental data, and a predefined interaction model between the global self-learning model and each local-self learning model.

The system 10 further comprises a second module 13 having a control unit (not shown) configured to receive the estimated schedule parameter 14 from the first module 11, receive a measured schedule parameter for each vehicle. The measured schedule parameter may for example be provided by one or more sensor systems 12 associated with the operational site(s). Further, the second control unit is configured to compare each estimated schedule parameter with each corresponding received measured schedule parameter, and to send a command signal to update the global self-learning model and the local self-learning model based on this comparison.

The second module 13 may further be provided with a validation feature. In more detail, the second module 13 may comprise another control unit, or the same control unit may be configured to validate the environmental data or vehicle data, and to update the database 4 based on this validation. The data validation may for example be based on input from the sensor systems (in-vehicle or infrastructure) which may measure a variety of parameters from the database. Such as for example, weather conditions, axle loads, tire pressure, etc.

The system 10 may further comprise a third module 15, which may be referred to as an integration module or extension module. The third module 15 comprises control circuitry configured to compare vehicle data of a new vehicle to be added to the fleet of vehicles with the data of each vehicle of the plurality of vehicles. The vehicle data may for example be included in the associated database 4 of the system 10. Further, the control circuitry of the third module 15 is configured to select a local self-learning model of at least one vehicle of the plurality of vehicle based on the comparison and at least one predefined constraint, and to implement a new local self-learning model into the new vehicle based on the selection.

In more detail, the control circuitry of the third module 15 can be configured to form a local self-learning model by utilizing fuzzy logic/analysis based on the local self-learning models of the plurality of vehicles. Thereby the new vehicle will be provided with a self-learning model having a larger share of the most similar vehicle's local self-learning model and a smaller share of the less similar vehicles' local self-learning models. The fuzzy analysis may be based on a plurality of parameters of the vehicle data such as e.g. transmission system, battery type, vehicle type, tire pressure, etc.

In more detail, the implementation of an AI module 11 having a combination of a global self-learning model and a plurality of local self-learning models, each associated with a specific vehicles, allows for a very scalable and versatile fleet management system 20. For example, adding and removing vehicles is facilitated since a type of plug-and-play feature is available, so that additions and removals of vehicles from/to the fleet at the operational site has little to no effect on the system since the various "AIs" are independent. Moreover, it provides for efficient utilization of already trained local self-learning models in that a new vehicle is cross-checked against already existing vehicles in order to find a suitable combination of one or more already running local self-learning models to be implemented into the new vehicle.

Figure 3:
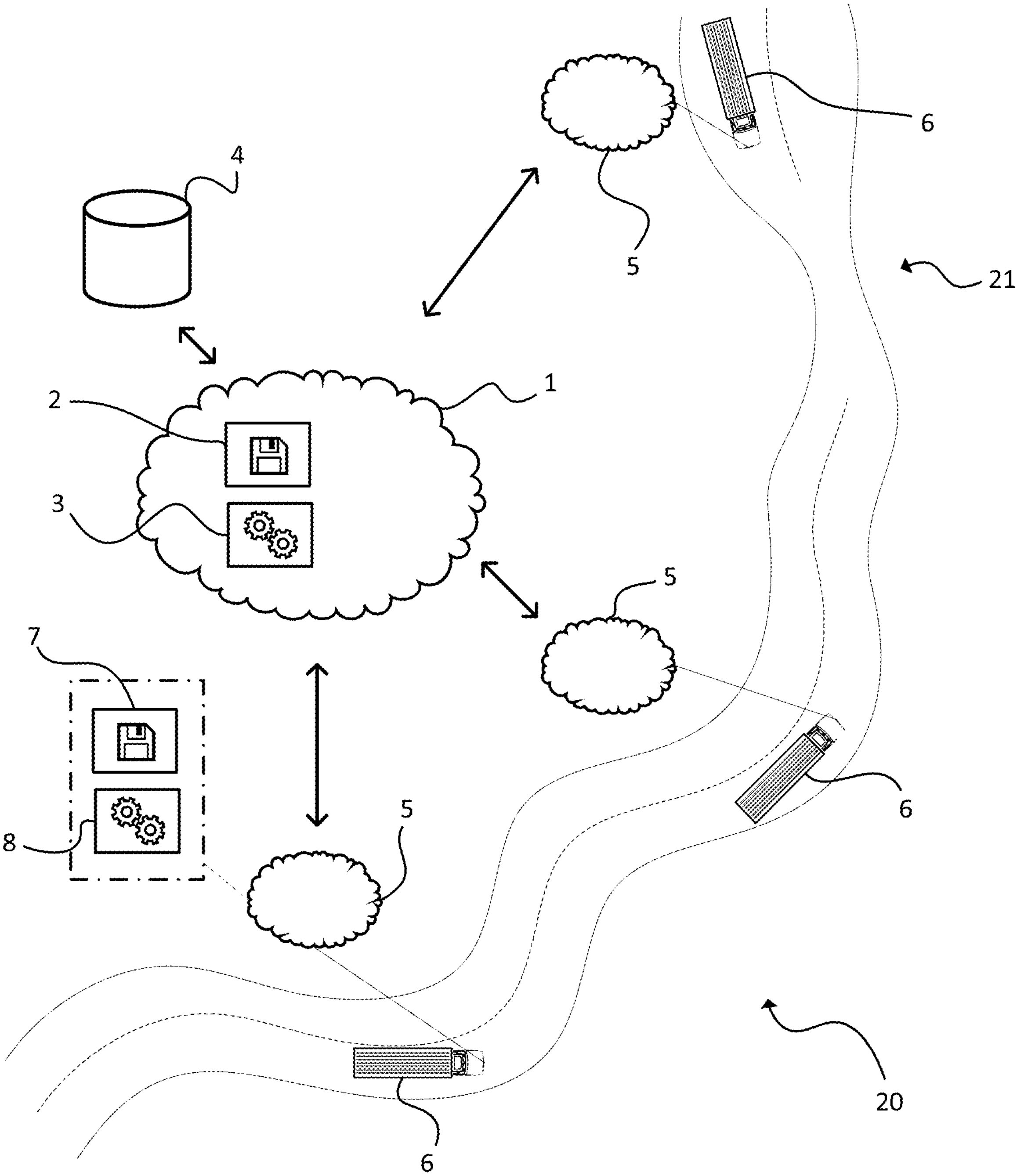
FIG. 3 is a schematic block diagram representation of a system for operating a fleet of vehicles according to an embodiment of the present invention.

FIG. 3 shows an overview illustration of a system for operating a fleet of vehicles according to an embodiment of the present invention. In particular, FIG. 3 illustrates how the local 5 and global/shared 1 parts of the self-learning model (AI) work together at an operational site 20. The global self-learning model 1 could be realized in a control tower (not shown) provided at the site 20, as a cloud-based solution accessible via an external wireless network (e.g. cellular network), or a distributed solution based on a Vehicle-to-Vehicle (V2V) communication protocol.

Each of the self-learning models 1, 5 can be realized by means of appropriate software, hardware or a combination thereof as indicated by the processors 3, 8 and associated memories 2, 7. The operational site 20 has a single lane traffic area (SLTA) 21, thus by accurately estimating or predicting arrival times for the vehicles 6, it is possible for a site operator to schedule departures in order to avoid queues forming at the SLTA 21, and thereby avoiding unnecessary idling.

Further, each vehicle 6 is connected to external network (s) via for instance a wireless link. The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, V2V, and/or vehicle to infrastructure, V2X. Examples of cellular radio technologies are GSM, GPRS, EDGE, LTE, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present disclosure has been presented above with reference to specific embodiments. However, other embodiments than the above described are possible and within the scope of the disclosure. Different method steps than those described above, performing the method by hardware or software, may be provided within the scope of the disclosure. Thus, according to an exemplary embodiment, there is provided a non-transitory computer-readable storage medium storing one or more programs configured to be executed by one or more processors of system for emulating remote control of a physical robot via a wireless network, the one or more programs comprising instructions for performing the method according to any one of the above-discussed embodiments. Alternatively, according to another exemplary embodiment a cloud computing system can be configured to perform any of the method aspects presented herein. The cloud computing system may comprise distributed cloud computing resources that jointly perform the method aspects presented herein under control of one or more computer program products.

The control unit(s) and control circuitry (associated with the fleet management system 10) may be or include any number of hardware components for conducting data or signal processing or for executing computer code stored in memory. The system may have an associated memory, and the memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The different features and steps of the embodiments may be combined in other combinations than those described.

The invention claimed is:

1. A method for operating a plurality of vehicles, each vehicle comprising an associated local self-learning model and wherein the plurality of vehicles are connected to a global self-learning model, said method comprising:

receiving a first set of vehicle data and a second set of vehicle data, the vehicle data comprising information about each vehicle of the plurality of vehicles, each vehicle operating along at least one fixed route;

receiving a first set of environmental data and a second set of environmental data, the environmental data comprising information about each fixed route;

estimating, by means of the global self-learning model and each local-self learning model, a schedule parameter for each vehicle of the plurality of vehicles based on the received first set of vehicle data, the received first set of environmental data, the received second set of vehicle data, the received second set of environmental data, and a predefined interaction model between the global self-learning model and each local-self learning model, wherein each of the local self-learning models make an initial estimation of the schedule parameter for the associated vehicle, where after the initial estimation is used as an input to the global self-learning model;

receiving a measured schedule parameter for each vehicle;

comparing the estimated schedule parameter with the received measured schedule parameter; and updating the global self-learning model and each local self-learning model based on the comparison of the estimated schedule parameter with the received measured schedule parameter operating the plurality of vehicles based on the estimated schedule parameters.

2. The method according to claim 1, wherein the predefined interaction model comprises:

making a first estimation of the schedule parameter for each vehicle by means of the global self-learning model based on the received first set of vehicle data and the received first set of environmental data;

making a second estimation of the schedule parameter by means of each local self-learning model for each corresponding vehicle based on the received second set of vehicle data and the received second set of environmental data, and the first estimation of the schedule parameter for each vehicle, the second estimation being the estimated schedule parameter.

3. The method according to claim 1, wherein the predefined interaction model comprises:

making a first estimation of the schedule parameter for each vehicle by means of the associated local self-learning model based on the received second set of vehicle data and the received second set of environmental data;

making a second estimation of the schedule parameter by means of means of the global self-learning model based on the received first set of vehicle data and the received first set of environmental data, and the first estimation of the schedule parameter for each vehicle, the second estimation being the estimated schedule parameter.

4. The method according to claim 1, further comprising:

comparing vehicle data of the new vehicle with the vehicle data of each vehicle of the plurality of vehicles;

selecting a local-self learning model of one of the vehicles of the plurality of based on the comparison and at least one predefined constraint; and implementing the selected local self-learning model into a new vehicle to be added to the plurality of vehicles.

5. The method according to claim 1, wherein the vehicle data comprises at least one of a geographical position of each vehicle, an acceleration request of each vehicle, a brake request of each vehicle, a cargo load of each vehicle, a transmission type of each vehicle, a state of charge of a traction battery of each vehicle, a state of health of the traction battery of each vehicle, and an axle load of each vehicle.

6. The method according to claim 1, wherein the environmental data comprises at least one of weather along each fixed route, route data of each fixed route, a road curvature of each fixed route, an inclination profile of each fixed route, operational data for each fixed route, infrastructural data for each fixed route, a time of day, and calendar data.

7. The method according to claim 1, wherein the schedule parameter is an arrival time to a destination, a fuel consumption, or a power consumption.

8. The method according to claim 1, wherein the vehicle data and/or the environmental data is retrieved from each vehicle of the plurality of vehicles.

9. The method according to claim 1, wherein the vehicle data and/or the environmental data is retrieved from a data storage unit connected to the plurality of vehicles.

10. A non-transitory computer-readable storage medium storing one or more programs configured to be executed by one or more processors of a vehicle fleet management system, the one or more programs comprising instructions for performing the method according to claim 1.

11. A system for operating a plurality of vehicles, each vehicle comprising an associated local self-learning model and wherein the plurality of vehicles are connected to a global self-learning model, the system comprising:

a first module comprising control circuitry configured to:

receive a first set of vehicle data and a second set of vehicle data, the vehicle data comprising information about each vehicle of the plurality of vehicles, each vehicle operating along at least one fixed route;

receive a first set of environmental data and a second set of environmental data, the environmental data comprising information about each fixed route;

estimate, by means of the global self-learning model and each local-self learning model, a schedule parameter for each vehicle of the plurality of vehicles based on the received first set of vehicle data, the received first set of environmental data, the received second set of vehicle data, the received second set of environmental data, and a predefined interaction model between the global self-learning model and each local-self learning model, wherein each of the local self-learning models make an initial estimation of the schedule parameter for the associated vehicle, where after the initial estimation is used as an input to the global self-learning model;

a second module comprising a control unit to:

receive the estimated schedule parameter from the first module;

receive a measured schedule parameter for each vehicle;

compare each estimated schedule parameter with each corresponding received measured schedule parameter;

send a command signal in order to update the global self-learning model and each local self-learning model based on the comparison, operate the plurality of vehicles based on the estimated schedule parameters.

12. The system according to claim 11, wherein the predefined interaction model comprises:

making a first estimation of the schedule parameter for each vehicle by means of the global self-learning model based on the received first set of vehicle data and the received first set of environmental data;

making a second estimation of the schedule parameter by means of each local self-learning model for each corresponding vehicle based on the received second set of vehicle data and the received second set of environmental data, and the first estimation of the schedule parameter for each vehicle, the second estimation being the estimated schedule parameter.

13. The system according to claim 11, wherein the predefined interaction model comprises:

making a first estimation of the schedule parameter for each vehicle by means of the associated local self-learning model based on the received second set of vehicle data and the received second set of environmental data;

making a second estimation of the schedule parameter by means of means of the global self-learning model based on the received first set of vehicle data and the received first set of environmental data, and the first estimation of the schedule parameter for each vehicle, the second estimation being the estimated schedule parameter.

14. The system according to claim 12, further comprising a third module comprising a control circuitry configured to:

compare vehicle data of a new vehicle to be added to the fleet of vehicles with the vehicle data of each vehicle of the plurality of vehicles;

selecting a local self-learning model of at least one vehicle of the plurality of vehicles based on the comparison and at least one predefined constraint; and implement a local self-learning model into the new vehicle based on the selection.

* * * * *